United States Patent
Yang et al.

(10) Patent No.: US 11,048,286 B2
(45) Date of Patent: Jun. 29, 2021

(54) CLUTCH PEDAL EFFORT REDUCTION STRUCTURE USING DETENT

(71) Applicants: HYUNDAI MOTOR COMPANY, Seoul (KR); KIA MOTORS CORPORATION, Seoul (KR)

(72) Inventors: Chang-Wan Yang, Hwaseong-si (KR); Ju-San Kim, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/685,083

(22) Filed: Nov. 15, 2019

(65) Prior Publication Data
US 2020/0257328 A1 Aug. 13, 2020

(30) Foreign Application Priority Data
Feb. 12, 2019 (KR) .................... 10-2019-0016165

(51) Int. Cl.
*G05G 1/44* (2008.04)
(52) U.S. Cl.
CPC ...................................... *G05G 1/44* (2013.01)
(58) Field of Classification Search
CPC .. G05G 1/44; G05G 5/03; G05G 1/30; G05G 1/36; G05G 1/506; G05G 7/04; B60K 23/02
USPC .......................................................... 74/512
See application file for complete search history.

(56) References Cited

U.S. PATENT DOCUMENTS

| 7,228,758 | B2 | 6/2007 | Fujiwara |
| 7,568,407 | B2 | 8/2009 | Kim et al. |
| 2009/0000418 | A1 | 1/2009 | Kim et al. |

FOREIGN PATENT DOCUMENTS

| DE | 3634003 A1 * | 4/1988 | ............... G05G 5/03 |
| DE | 20220483 U1 * | 10/2003 | ............... B60T 7/06 |
| DE | 102011111087 A1 * | 2/2013 | ............ B60K 23/02 |
| DE | 102015200789 A1 * | 7/2016 | ............ B60K 23/02 |
| FR | 2771523 A1 * | 5/1999 | ............... G05G 5/03 |
| FR | 2967270 A1 * | 5/2012 | ............... G05G 1/30 |
| JP | H02-009390 Y2 | 3/1990 | |
| JP | 2536953 Y2 | 3/1997 | |
| JP | 2010-073109 A | 4/2010 | |
| KR | 10-0851323 B1 | 8/2008 | |
| KR | 10-0892479 B1 | 4/2009 | |
| KR | 101481340 B1 * | 1/2015 | ............... G05G 5/03 |
| KR | 101481345 B1 * | 1/2015 | ............ B60K 23/02 |

(Continued)

*Primary Examiner* — Thomas C Diaz
(74) *Attorney, Agent, or Firm* — Brinks Gilson & Lione

(57) ABSTRACT

A clutch pedal effort reduction structure using a detent may include: a pedal arm to rotate with respect to a hinge fixed to a vehicle body; and a spring module to reduce a pedal effort when the pedal arm rotates with respect to the hinge. In particular, the pedal arm includes a pedal arm groove provided with one or more curved portions having a curvature and rotates depending on a rotation of the pedal arm, and the spring module includes a support portion held in close contact with the pedal arm groove so as to be in contact with the one or more curved portions when the pedal arm rotates. And a force by which the spring module presses the pedal arm is changed according to a curvature of the curved portions which the support portion is in contact with when the pedal arm is operated.

12 Claims, 16 Drawing Sheets

(56) References Cited

FOREIGN PATENT DOCUMENTS

| KR | 10-1509997 | B1 | 4/2015 |
| KR | 10-1535024 | B1 | 7/2015 |
| KR | 10-1567728 | B1 | 11/2015 |
| KR | 10-1794855 | B1 | 12/2017 |

* cited by examiner

CLUTCH PEDAL EFFORT REDUCTION STRUCTURE USING DETENT

CROSS-REFERENCE TO RELATED APPLICATION

This application claims priority to and the benefit of Korean Patent Application No. 10-2019-0016165, filed on Feb. 12, 2019, the contents of which are incorporated herein by reference.

FIELD

The present disclosure relates to a clutch pedal effort reduction structure using a detent capable of adjusting a clutch pedal effort with a simple structure.

BACKGROUND

The statements in this section merely provide background information related to the present disclosure and may not constitute prior art.

A vehicle is equipped with a transmission that shifts an engine revolution per minute (engine RPM) to a vehicle speed and transmits the shifted engine RPM to a drive wheel. The transmission can be divided into an automatic transmission and a manual transmission depending on an operation method. The automatic transmission is automatically shifted through a hydraulic circuit provided in the transmission. The manual transmission is shifted by a driver's operation.

The manual transmission is provided with a clutch for selective power delivery between a crankshaft of the engine and an input shaft of the transmission. The clutch provided in the manual transmission disengages the crankshaft of the engine from the input shaft of the transmission when a driver operates a clutch pedal.

As shown in FIG. 1, a clutch pedal 1 is configured to include a pedal arm 2 which is operated by a driver, a master cylinder 3 which converts an operating force by which the driver operates the pedal arm 2 into a hydraulic pressure, a turnover spring 4 which reduces a pedal effort generated in an opposite direction to the operating force when the driver operates the pedal arm 2, and a bracket 5 which fixes the pedal arm 2 and the turnover spring 4.

We have discovered that, in order for the turnover spring 4 to reduce the pedal effort, a space in which the turnover spring 4 can be sufficiently compressed or tensioned has to be provided in the bracket 5, however, it is difficult to design a layout of the bracket 5 for installation of the turnover spring 4 and a layout of a driver's seat leg room in which the bracket 5 is to be mounted.

Further, since the bracket 5 should bear an elastic force generated from the turnover spring 4, stiffness of the bracket 5 has to be sufficiently secured, which makes it difficult to select a material constituting the bracket 5 and to reduce a weight of the bracket 5.

In addition, we have also found that since the turnover spring 4 has to be rotated not only by a compressive tension but also by the operation of the pedal arm 2, the turnover spring 4 is highly likely to be damaged by fatigue. Further, as shown in FIG. 2, when the stiffness of the turnover spring 4 is increased from S1 to S2, a section A in which the pedal effort reduction force is increased and a section B in which the pedal effort reduction force is reduced with respect to a turn point T depending on the tensile compression or the rotation degree of the turnover spring 4 are generated at the same time. Therefore, it was difficult to change the degree of reducing the pedal effort.

Moreover, since a link structure 6 has to be mounted between the pedal arm 2 and the bracket 5 in order to mount the turnover spring 4 on the bracket 5, the number of required components is excessive and the assembly is troublesome.

SUMMARY

The present disclosure provides a clutch pedal effort reduction structure using a detent which can easily design a layout of a bracket for installation of a pedal arm and a layout of a leg room for mounting the bracket, reduce a weight of the bracket and increase a service life of the bracket, and easily adjust a degree of reducing a pedal effort, and can be easily assembled.

A clutch pedal effort reduction structure using a detent includes: a pedal arm configured to rotate with respect to a hinge fixed to a vehicle body; and a spring module configured to reduce a pedal effort when the pedal arm rotates with respect to the hinge. In particular, the pedal arm includes a pedal arm groove which is provided with one or more curved portions having a curvature and rotates depending on the rotation of the pedal arm, the spring module includes a support portion which is held in close contact with the pedal arm groove so as to be in contact with the one or more curved portions when the pedal arm rotates and has a position constrained to the vehicle body, and a force by which the spring module presses the pedal arm is changed according to the curvature of the one or more curved portions when the pedal arm is operated.

The clutch pedal effort reduction structure may further include a bracket mounted on the vehicle body, and the bracket include: a horizontal member to which the hinge is fixed and a vertical member to which one side end portion of the horizontal member is connected and has first and second ends fixed to the vehicle body.

The pedal arm may extend from the horizontal member through the vertical member.

The spring module may include: a guide arm fixed to the vertical member so as to protrude toward the hinge; an adjusting nut fastened to the guide arm so that the guide arm penetrates through a center of the adjusting nut; and a spring mounted on the guide arm so as to penetrate through the center of the adjusting nut and having a first side supported by the adjusting nut, and the support portion is fastened to the guide arm so as to compress the spring.

One side end portion of the guide arm may be provided with a welding portion which is engaged with the vertical member.

The support portion may include: a fastening arm penetrating through the spring and coupled to the guide arm; a plate attached to an end portion of the fastening arm and supporting the other side of the spring, and a contact portion formed on a surface of the plate so as to be symmetrical with the fastening arm and being in contact with the one or more curved portions.

The plate may have a disk shape, the contact portion may be formed along a diameter of the plate, and the contact portion may have an end portion forming a curvature and be in contact with the one or more curved portions.

The pedal arm groove may include: a body portion protruding from one side portion of the pedal arm so as to protrude toward the guide arm, and one side of the body portion facing the guide arm may be provided with the one or more curved portions.

A fixed rib may protrude from one side portion of a pedal arm, the pedal arm groove may include a body portion having a mounting hole, into which the fixed rib is inserted, provided on one side thereof and a fixture penetrating through the body portion and the fixed rib to integrate the fixed rib and the body portion, and one side of the body portion facing the guide arm may be provided with the one or more curved portions.

The fixture may include: a bolt penetrating through the body portion and the fixed rib; and a nut fastened to the bolt.

A clutch pedal effort reduction structure using a detent includes: a pedal arm configured to rotate with respect to a hinge fixed to a vehicle body; and a spring module configured to reduce a pedal effort when the pedal arm rotates. In particular, the pedal arm includes a pedal arm groove which is provided with a plurality of curved portions having a curvature and rotates depending on the rotation of the pedal arm, the spring module include a support portion which continuously contacts the plurality of curved portions when the pedal arm rotates and has a position constrained to the vehicle body, and a force by which the spring module presses the pedal arm is changed according to the curvature of the plurality of curved portions with which the support portion is in contact when the pedal arm rotates.

The pedal arm groove may include: a body portion protruding from one side portion of the pedal arm so as to protrude toward the spring module, and one side of the body portion facing the guide arm may be continuously provided with the plurality of curved portions.

A fixed rib may protrude from one side portion of the pedal arm, and the pedal arm groove may include a body portion which has a mounting hole, into which the fixed rib is inserted, provided on one side thereof; and a fixture penetrating through the body portion and the fixed rib to integrate the fixed rib and the body portion, and one side of the body portion facing the guide arm may be continuously provided with the plurality of curved portions.

The fixture may include: a bolt penetrating through the body portion and the fixed rib; and a nut fastened to the bolt.

According to the clutch pedal effort reduction structure using a detent according to the exemplary forms of the present disclosure configured as described above, the degree of reducing the pedal effort by the spring module can be adjusted according to the shape of the curved portion formed in the pedal arm groove.

Further, since the spring module is provided inside the bracket in a fixed form, it is easy to design the layout of the bracket and to reduce the weight of the bracket. In particular, when the volume of the bracket is reduced or minimized, it is easy to design the layout of the driver's seat leg room.

In addition, since the force by which the spring elastically supports the pedal arm groove in response to the position of the adjusting nut mounted on the spring module is changed, the reduction of the pedal effort can be easily adjusted.

In addition, since the position of the spring module is fixed, the service life of the spring is increased or maximized.

In addition, since components other than the pedal arm and the spring module is unnecessary, the assembly is easily made.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
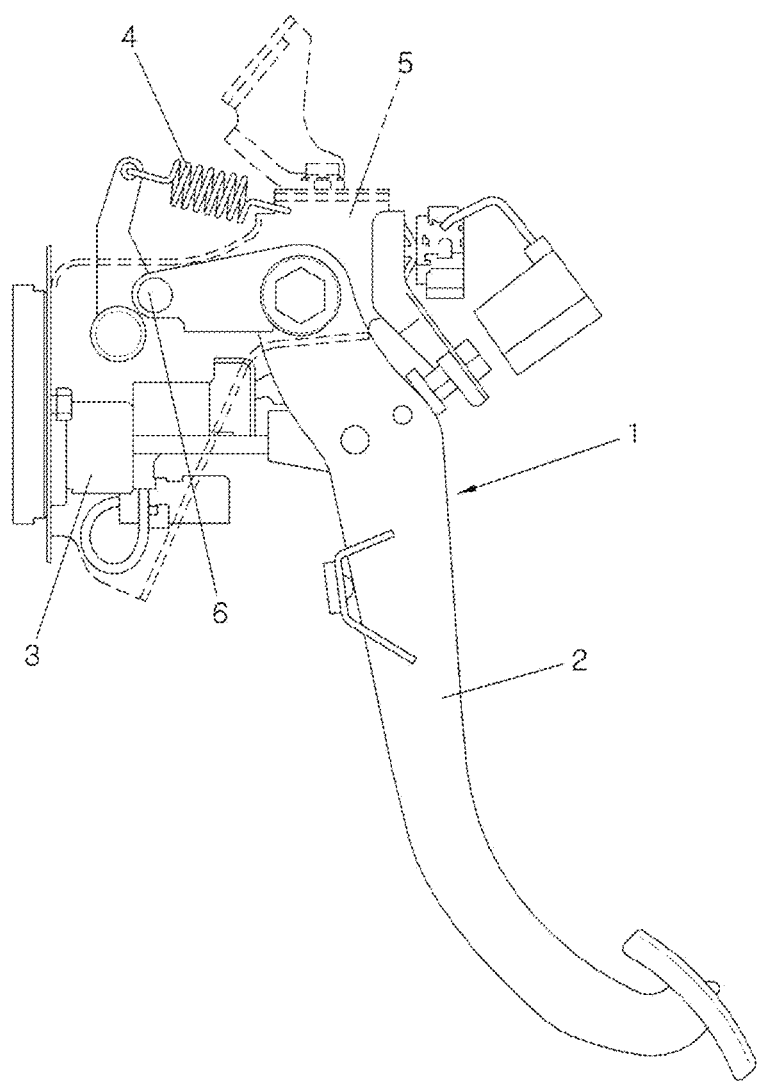
FIG. 1 is an exemplified diagram of a conventional clutch pedal.
Figure 2:
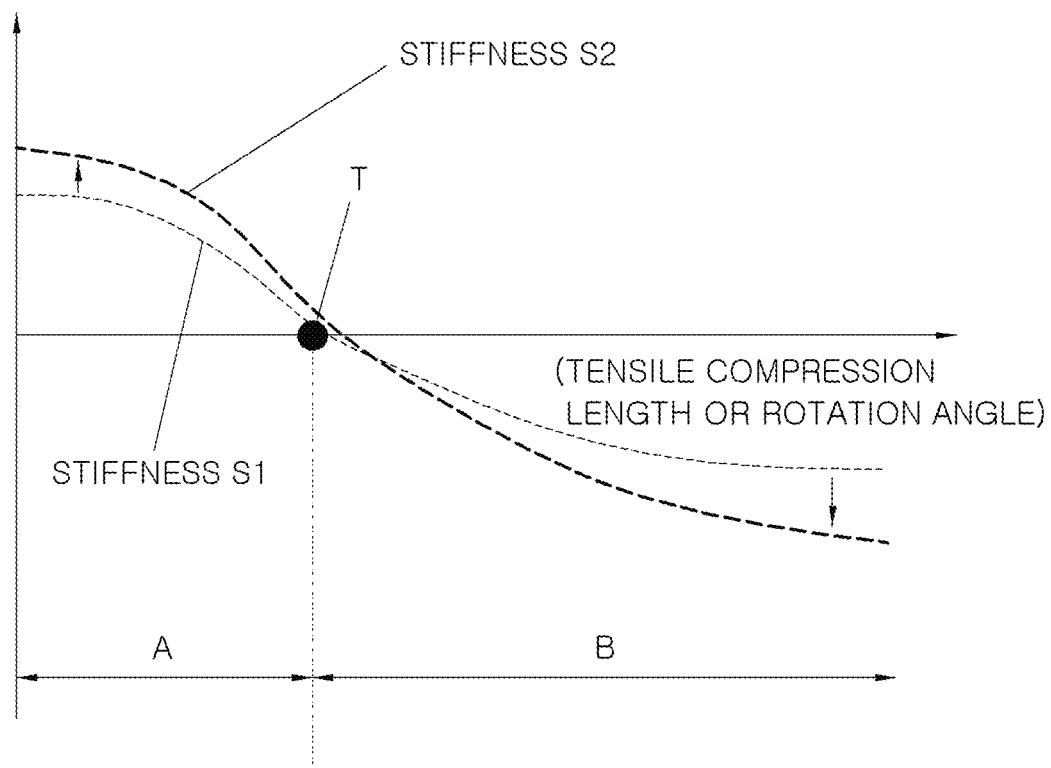
FIG. 2 is a graph showing a change in a pedal effort reduction force in response to a change in stiffness of a turnover spring provided in FIG. 1.
Figure 3:
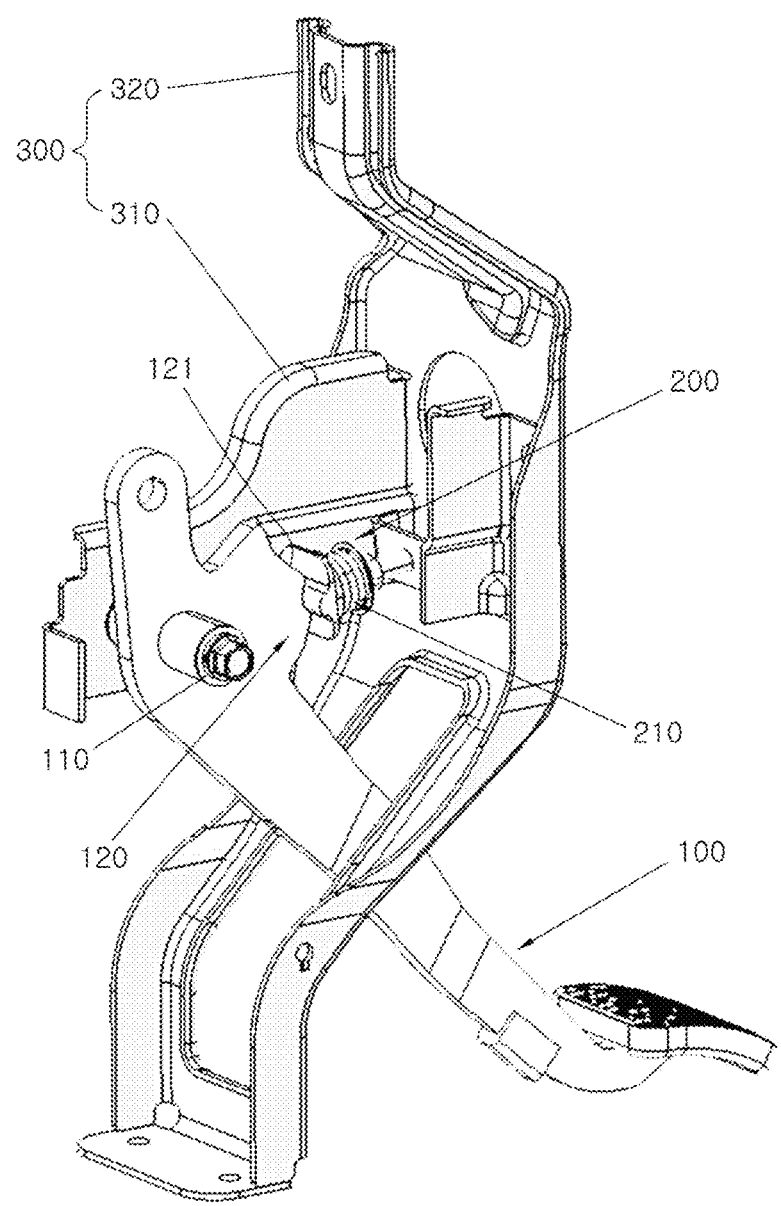
FIG. 3 is a perspective view showing a clutch pedal effort reduction structure using a detent according to an exemplary form of the present disclosure.
Figure 4:
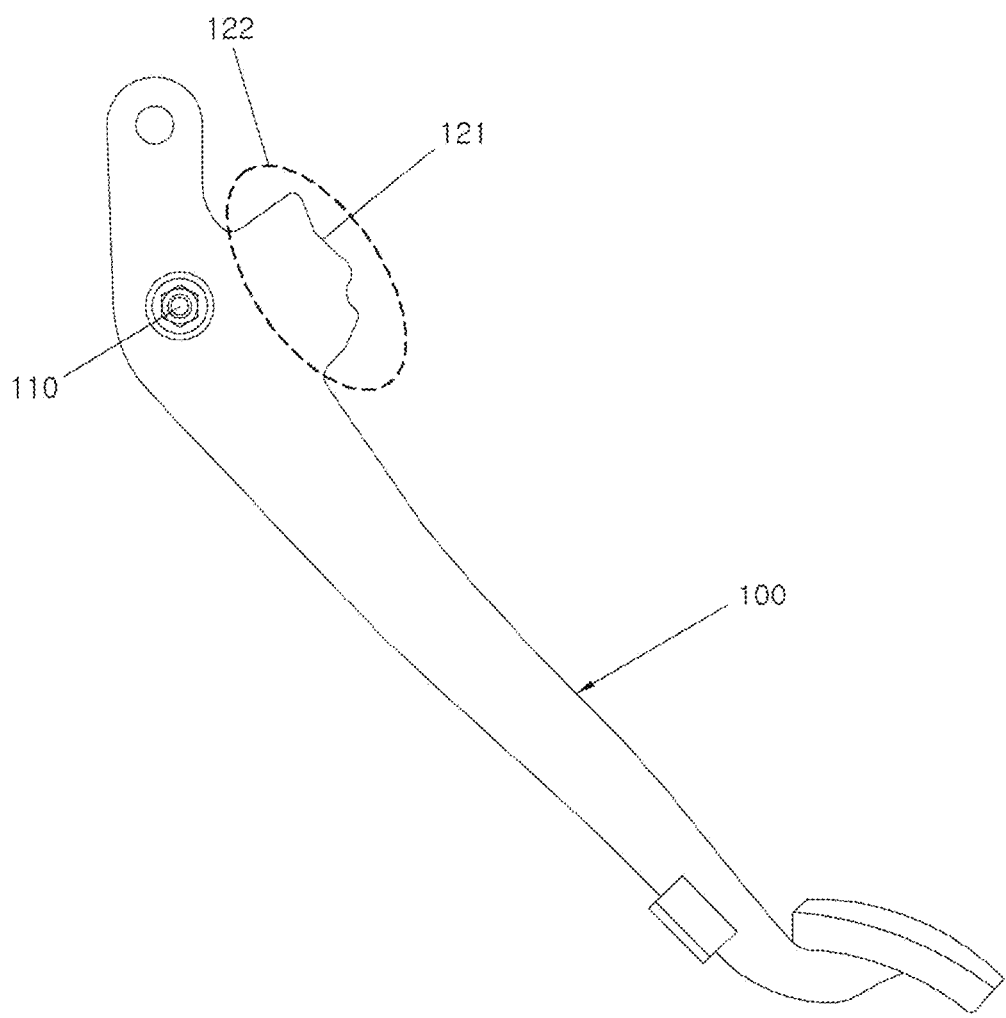
FIG. 4 is a side view of a pedal arm of FIG. 3.
Figure 5:
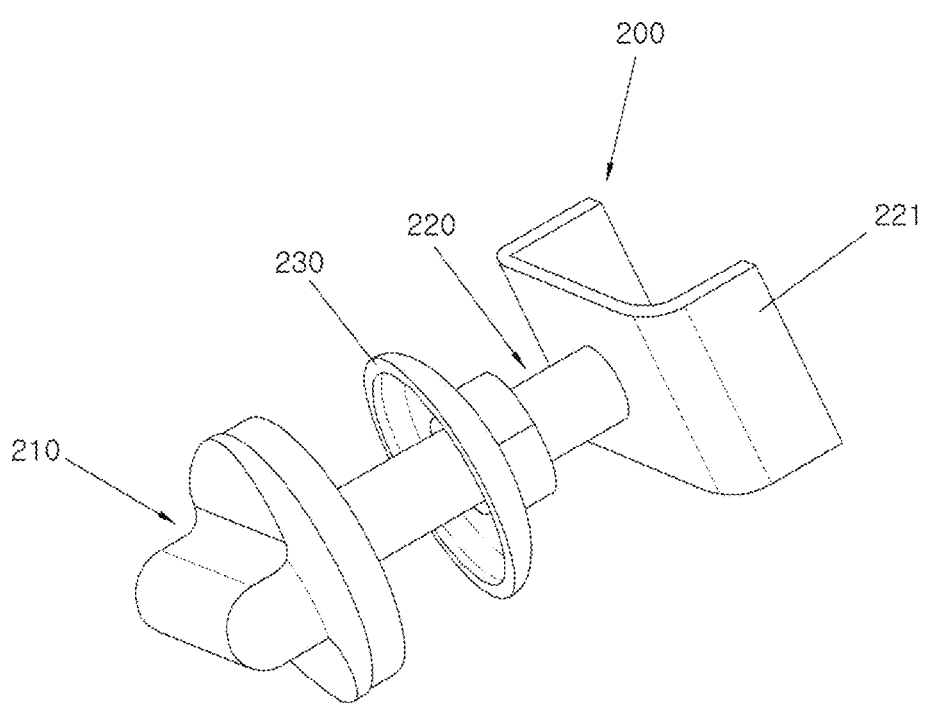
FIG. 5 is a perspective view of a spring module of FIG. 3.
Figure 6:
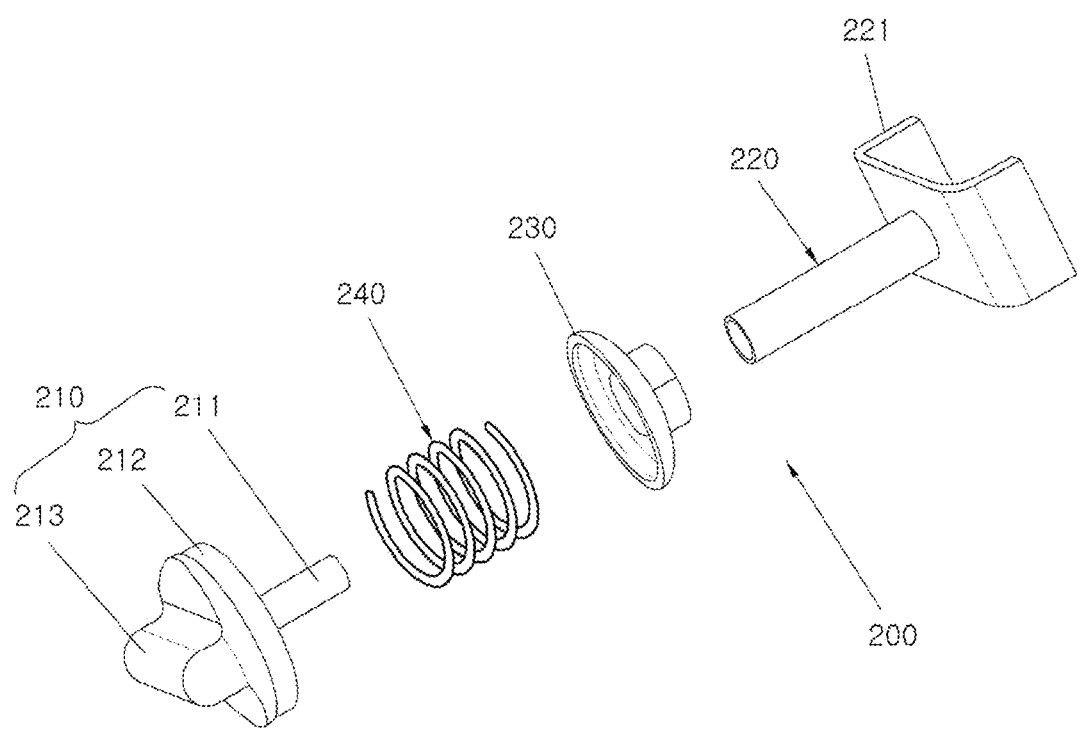
FIG. 6 is an exploded perspective view of the spring module of FIG. 3.
Figure 7:
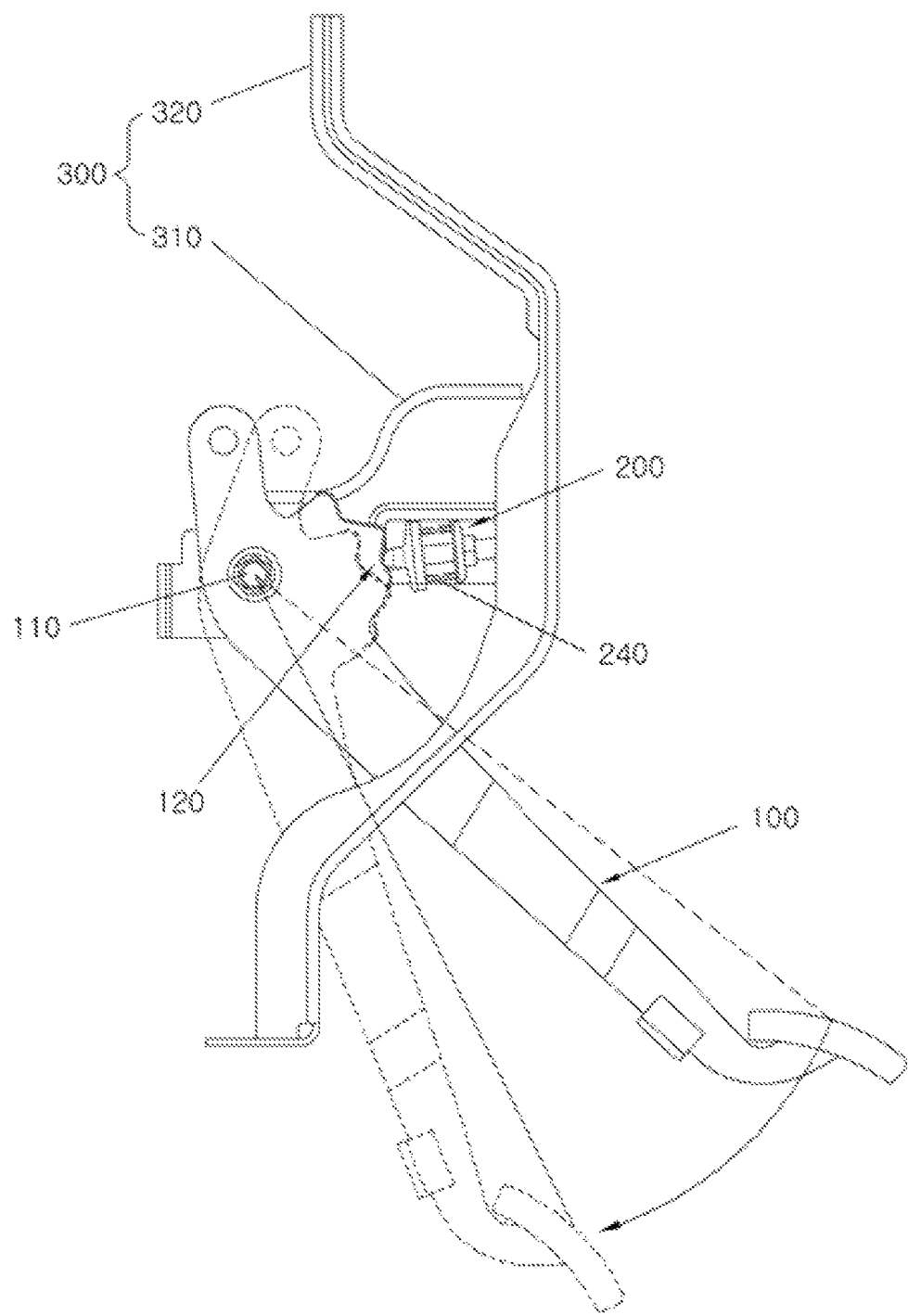
FIG. 7 is an exemplified diagram illustrating an operation of the clutch pedal effort reduction structure using a detent of FIG. 3.
Figure 8:
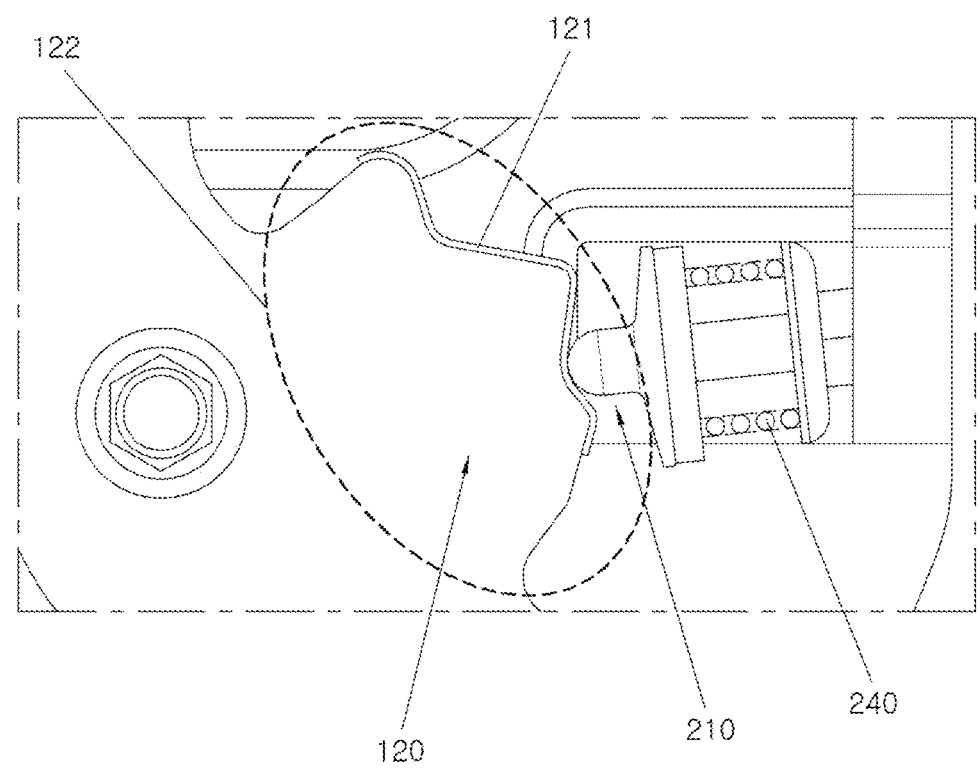
FIG. 8 is an enlarged view of a main part of the clutch pedal effort reduction structure using a detent of FIG. 7.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a clutch pedal effort reduction structure using a detent according to an exemplary form of the present disclosure will be described with reference to the accompanying drawings.

As shown in FIGS. 3 to 8, the clutch pedal effort reduction structure using the detent according to an exemplary form of the present disclosure includes: a pedal arm 100 which rotates with respect to a hinge 110 fixed to a vehicle body, a spring module 200 which reduces the pedal effort when the pedal arm 100 is operated to rotate with respect to the hinge 110, and a bracket 300 mounted on the vehicle body.

The pedal arm 100 includes a pedal arm groove 120 which is provided with one or more curved portions 121 and which rotates depending on a rotation of the pedal arm 100. The pedal arm groove 120 includes a body portion 122 which protrudes from one side portion of the pedal arm 100 so as to protrude toward a guide arm 220. One side of the body portion 122 facing the guide arm 220 is provided with one or more curved portions 121.

The spring module 200 includes a support portion 210 which is held in close contact with the pedal arm groove 120 so as to be in contact with one or more curved portions 121 when the pedal arm 100 rotates and has a position constrained to a vehicle body. When the pedal arm 100 is operated, the force by which the spring module 200 presses the pedal arm 100 is changed depending on a curvature of the curved portion 121 which the support portion 210 is in contact with.

The bracket 300 includes a horizontal member 310 to which the hinge 110 is fixed and a vertical member 320 to which one side end portion of the horizontal member 310 is connected and has both ends in a longitudinal direction fixed to the vehicle body. The pedal arm 100 extends from the horizontal member 310 through the vertical member 320.

The spring module 200 includes a guide arm 220 which is fixed to the vertical member 320 so as to protrude toward the hinge 110, an adjusting nut 230 which is fastened to the guide arm 220 so that the guide arm 220 penetrates through a center of the adjusting nut 230, a spring 240 which is mounted on the guide arm 220 so as to penetrate through the center of the adjusting nut 230 and has one side supported by the adjusting nut 230, and the support portion 210 which is fastened to the guide arm 220 to compress the spring 240. As the spring 240, types of a descend spring, a return spring, and a turnover spring may be selectively applied depending on the shape of the pedal arm groove 120.

One side end portion of the guide arm 220 is provided with a welding portion 221 which is engaged with the vertical member 320 of the bracket 300. The support portion 210 includes a fastening arm 211 which penetrates through the spring 240 and is coupled to the guide arm 220, a plate 212 which is attached to an end portion of the fastening arm 211 and supports the other side of the spring 240, and a contact portion 213 which is formed on a surface of the plate 212 so as to be symmetrical with the fastening arm 211 and is in contact with the curved portion 121. The plate 212 has a disk shape. The contact portion 213 has a column shape along a diameter of the plate 212. The contact portion 213 is formed so that an end portion which is in contact with the curved portion 121 has a curvature.

Figure 9:
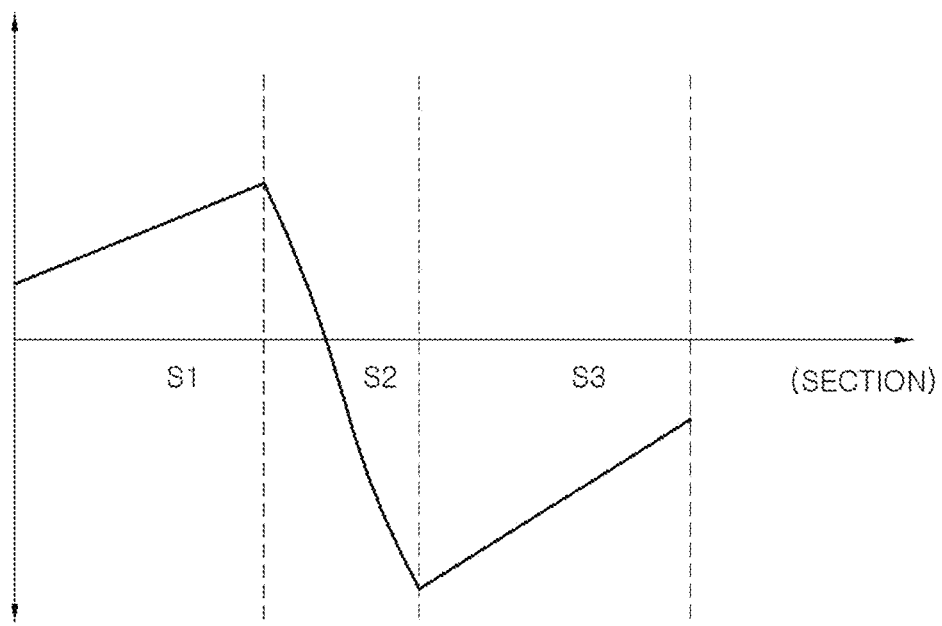
FIG. 9 is a graph showing a change in a compressive force generated in the spring module by the operation of the clutch pedal effort reduction structure using a detent of FIG. 7.
Figure 10:
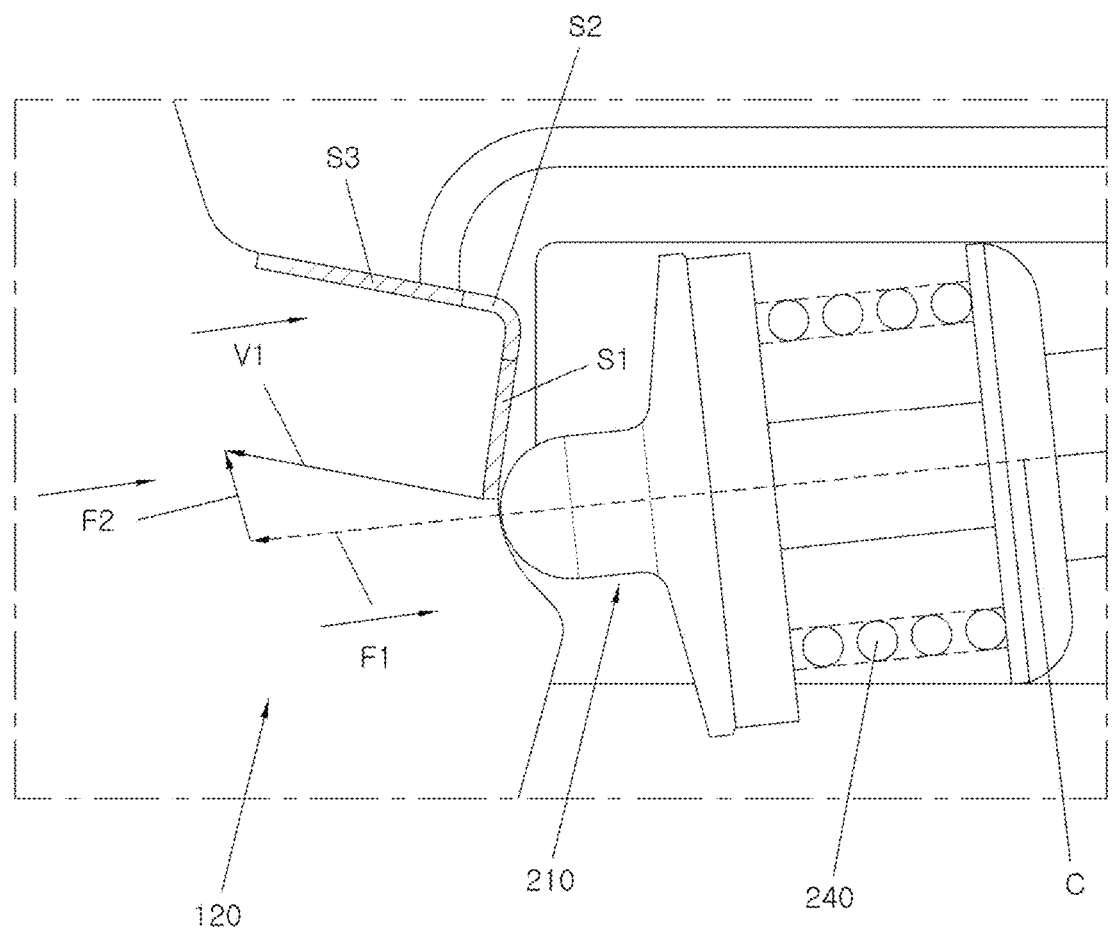
FIGS. 10 to 12 are diagrams respectively showing a state of a pedal arm groove and the spring module in first to third sections indicated in the graph of FIG. 9.

Referring to FIGS. 9 and 10, when the pedal arm 100 starts to rotate with respect to the hinge 110 according to the driver's operation, the support portion 210 continuously presses a first section S1 of the pedal arm groove 120 by the elasticity of the spring 240. In this case, a degree of compressing the spring 240 is changed depending on the curvature of the curved portion 121 formed in the first section S1. The spring 240 applies to the pedal arm groove 120 a force of an A vector ($\vec{V1}$) which is a combination of a tangential force ($\vec{F2}$) of the pedal arm 100 and a radial force ($\vec{F1}$) of the pedal arm 100 which are shown in FIG. 10.

Assuming that the pedal arm 100 rotates in the first section S1, a direction of the A vector ($\vec{V1}$) is maintained unward with respect to a central axis C of the spring 240, and a magnitude of the A vector ($\vec{V1}$) is gradually increased, such that a pressing force of the spring 240 opposed to a pressing force of a driver in the first section S1 is continuously increased as shown in FIG. 9.

Figure 11:
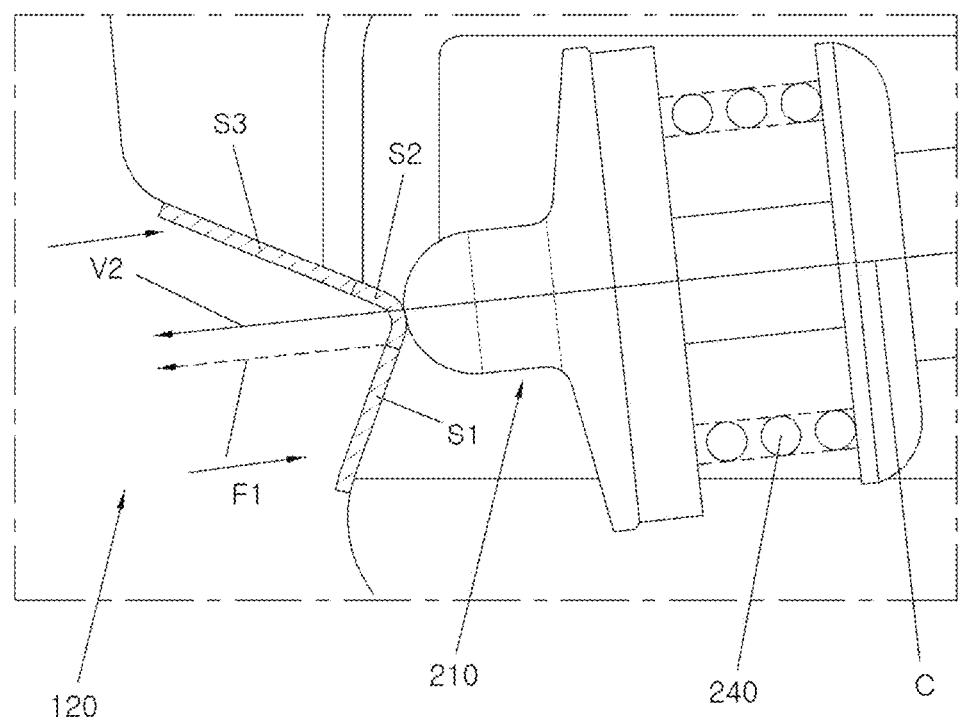

Referring to FIGS. 9 and 11, when the pedal arm 100 is continuously operated after the first section S1, the support portion 210 continuously presses a second section S2 beyond the first section S1 of the pedal arm groove 120. In this case, the spring 240 is compressed and then tensioned depending on the curvature of the curved portion 121 formed in the second section S2.

In the second section S2, the spring 240 applies to the pedal arm groove 120 a force of a B-1 vector (not shown) which maintains directionality of the A vector ($\vec{V1}$) and is gradually reduced from its maximum value, and then applies to the pedal arm groove 120 a force of a B-2 vector ($\vec{V2}$) by which the elastic force of the spring 240 is completely transmitted to the pedal arm groove 120 when the tangential force of the pedal arm 100 is 0. Then, when the pedal arm 100 further rotates, the tangential force ($\vec{F2}$) of the pedal arm 100 is applied in a direction opposite to that of the first section S1. The tangential force ($\vec{F2}$) of the pedal arm 100 is applied downward with respect to the central axis C of the spring 240. A force of a B-3 vector (not shown) which is a combination of the tangential force ($\vec{F2}$) of the pedal arm 100 which is applied downward with respect to the central axis C of the spring 240 and the radial force ($\vec{F1}$) of the pedal arm 100 is applied to the pedal arm groove 120 by the spring 240.

Accordingly, in the second section S2, the pressing force of the spring 240 opposite to the pressing force of the driver is gradually reduced as shown in FIG. 9, and then is continuously increased by changing the direction thereof to a direction that helps the rotation of the pedal arm 100.

Figure 12:
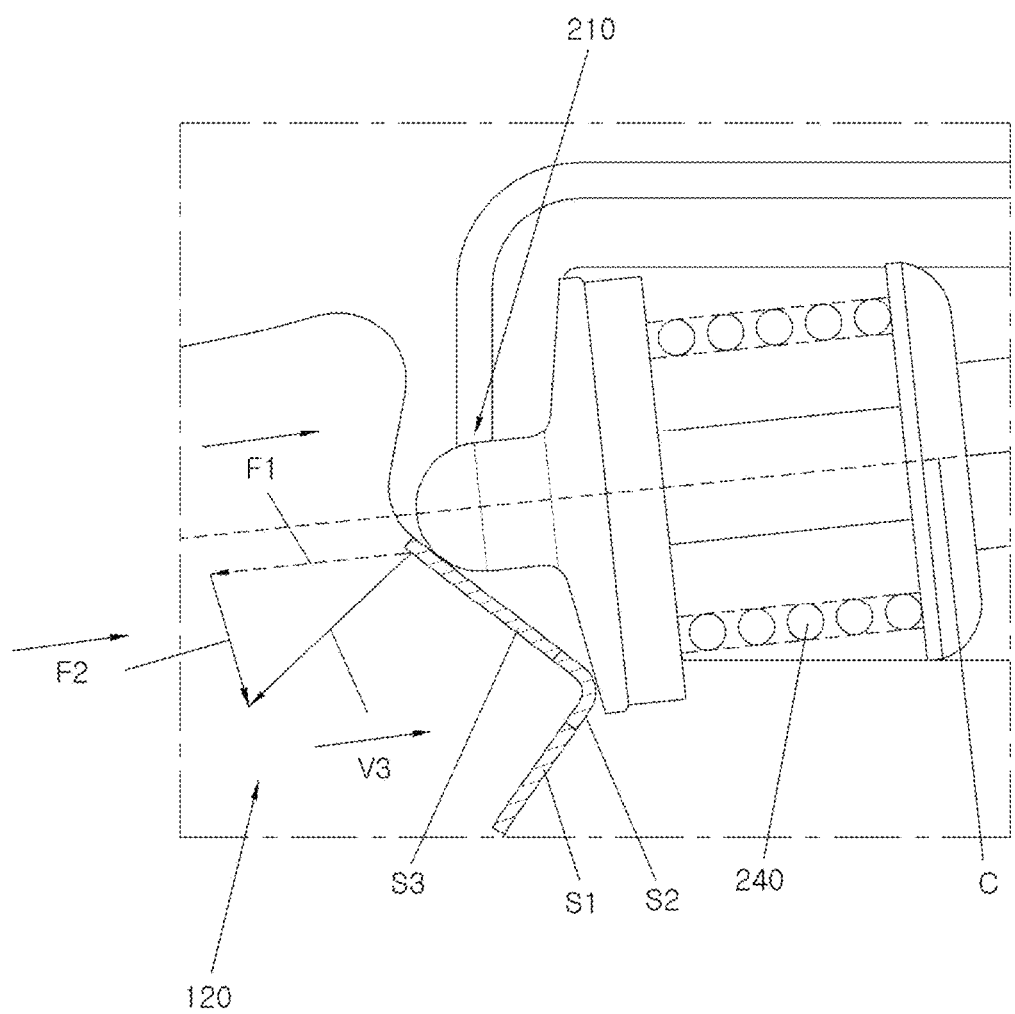

Referring to FIGS. 9 and 12, when the pedal arm 100 is continuously operated after the second section S2, the support portion 210 continuously presses a third section S3 beyond the second section S2 of the pedal arm groove 120. In this case, the spring 240 is tensioned depending on the curvature of the curved portion 121 formed in the third section S3. In the third section S3, as the spring 240 is tensioned, the radial force of the pedal arm 100, which is being pressed against the support portion 210, is gradually reduced.

As shown in FIG. 9, in the third section S3, the spring 240 maintains the direction of the B-3 vector, but as the radial force ($\vec{F1}$) of the pedal arm 100 is reduced, the force of the C vector ($\vec{V3}$) in which an absolute value of the magnitude thereof is gradually reduced is applied to the pedal arm grove 120.

Therefore, in the third section S3, the pressing force of the spring 240 opposite to the pressing force of the driver maintains the directionality that helps the rotation of the pedal arm 100, but is gradually reduced.

Figure 13:
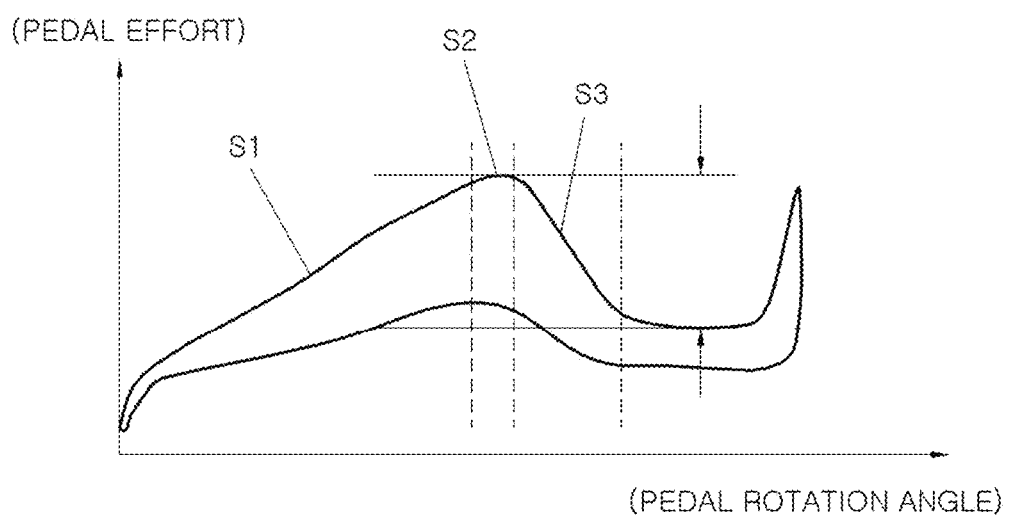
FIG. 13 is a graph showing a change in a pedal effort of the pedal arm generated by the operation of the clutch pedal effort reduction structure using a detent of FIG. 7.

FIG. 13 is a graph showing a pedal effort that a driver feel when the pedal arm 100 completely rotated with respect to the hinge 110 by the driver's operation and then restored to the state before being operated.

In the first section S1 immediately after the operation starts, the A vector ($\vec{V1}$) is applied, such that the pedal effort is continuously increased. In the second section S2 beyond the first section S1, as the B-1 vector, the B-2 vector ($\vec{V2}$), and the B-3 vector are continuously operated, a change in a parabolic shape in which the increment of the pedal effort is reduced and then the maximum value is recorded and the reduction amount of the pedal effort is increased is shown. In the third section S3 beyond the second section S2, as the C vector ($\vec{V3}$) is applied, the pedal effort is continuously reduced and then reaches a first specific value as the force provided by the spring 240 becomes zero. Then, if the pedal arm 100 further rotates, a reaction force is generated as the master cylinder is not be further compressed, and the pedal effort is increased by the generated reaction force.

When the rotation angle of the pedal arm 100 becomes a maximum value and then the driver gradually reduces the pressing force, the support portion 210 is restored to the position before the operation of the pedal arm 100 through the third section S3, the second section S2, and the first section S1 of the pedal arm groove 120. When the driver gradually reduces the pressing force, the pedal effort is also suddenly reduced as the reaction force by the master cylinder is suddenly reduced. The pedal effort holds a second specific value until the spring 240 is compressed. The pedal effort is increased as the support portion 210 passes through the third section S3 and the C vector ($\vec{V3}$) is applied reversely. As the B-3 vector, the B-2 vector ($\vec{V2}$), and the B-1 vector are applied reversely in the second section S2 beyond the third section S3, it is shown that the pedal effort is changed in the parabolic shape. As the A vector ($\vec{V1}$) is applied reversely in the first section S1 beyond the second section S2, the pedal effort is continuously reduced. When the pedal arm 100 rotates and moves to the position before the operation, the initial pedal effort of the pedal arm 100 becomes zero through a reaction force of a stopper, and the position of the pedal arm 100 is also fixed.

A difference value between the maximum pedal effort value in the second section S2 and the first specific value in which the pedal effort is reached in the third section S3 may be converted into a so-called hump feeling that the driver feels at the time of operating the pedal arm 100. Since the magnitude of the vector provided to the pedal arm groove 120 by the spring 240 is changed by changing the curvature of the plurality of curved portions 121 continuously formed in the pedal arm groove 120 or by changing the position of the adjusting nut 230, the hump feeling may be provided according to the driver's preference. The aspect of the change in the pedal effort may also be adjusted according to the driver's preference.

In addition, in the third section S3 after the second section S2 in which the maximum value of the pedal effort is felt, the pedal effort is continuously reduced and then reaches the first specific value, and therefore timing when the second section S2 and the third section S3 are generated is synchronized with the shift possible timing, such that it is possible to induce the driver to recognize the shift operation timing. In addition, only the initial return force may be reduced. It is also possible to suddenly reduce the pedal effort in a specific section.

Figure 14:
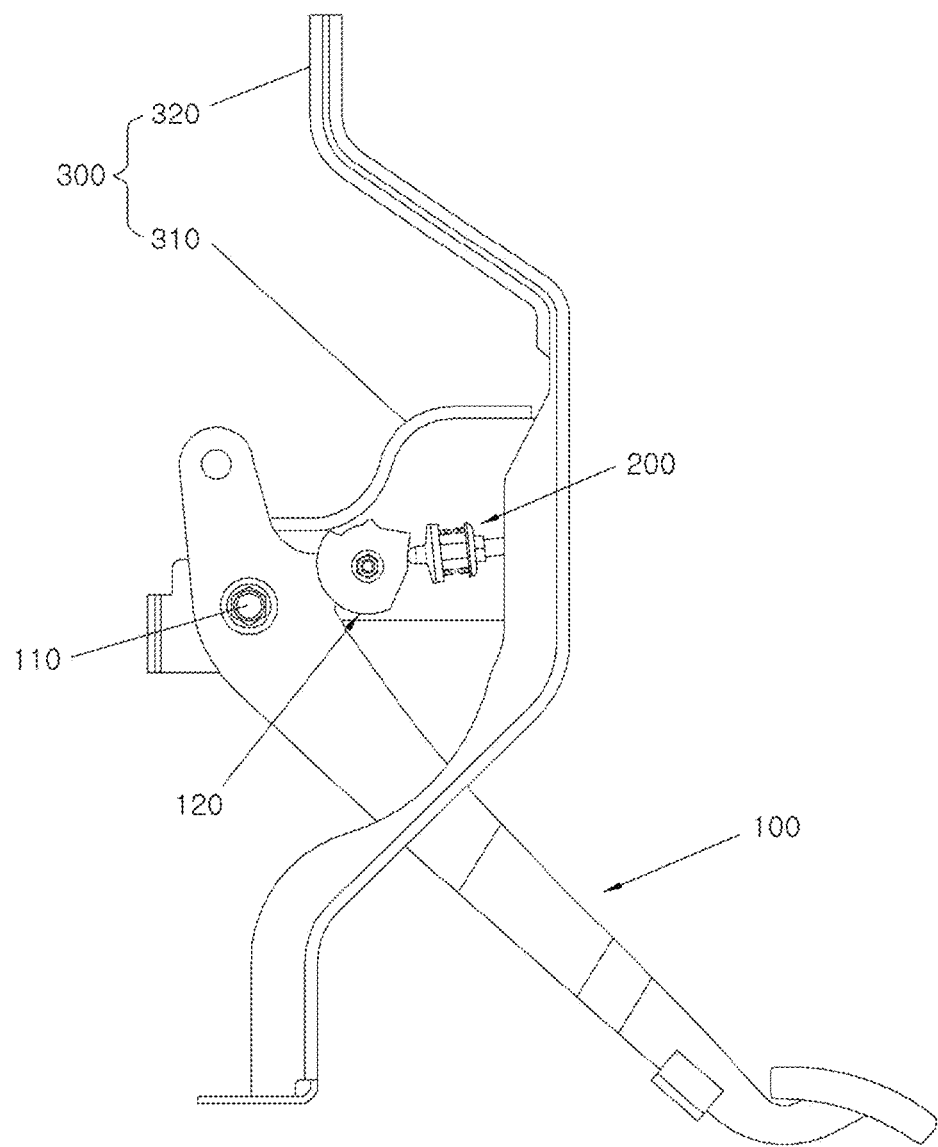
FIG. 14 is a perspective view showing a clutch pedal effort reduction structure using a detent according to another form of the present disclosure.
Figure 15:
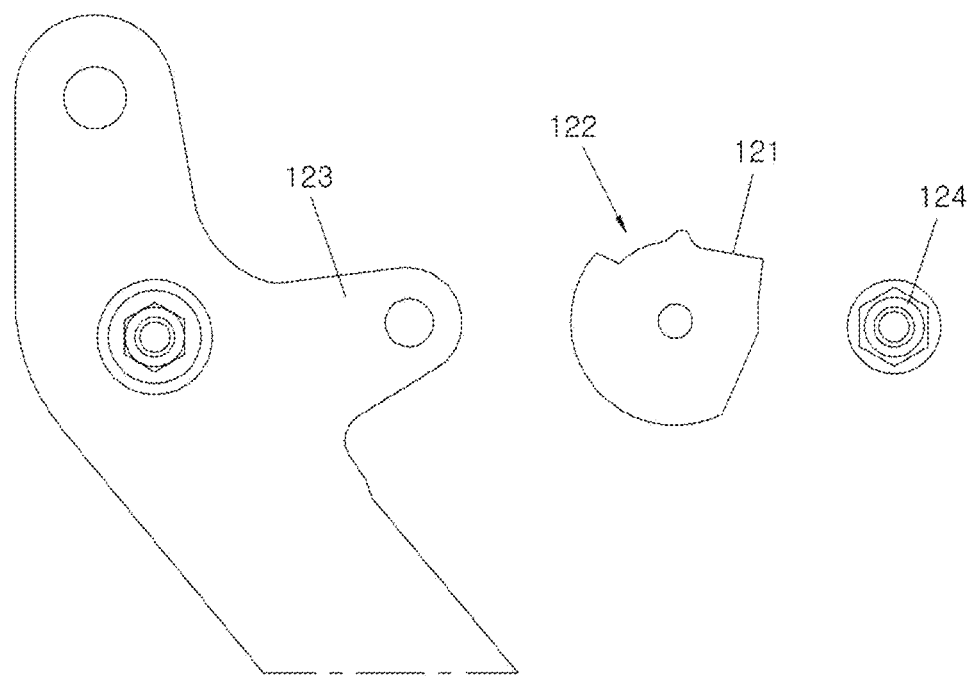
FIG. 15 is an exploded perspective view of a main part of the clutch pedal effort reduction structure using a detent of FIG. 14.
Figure 16:
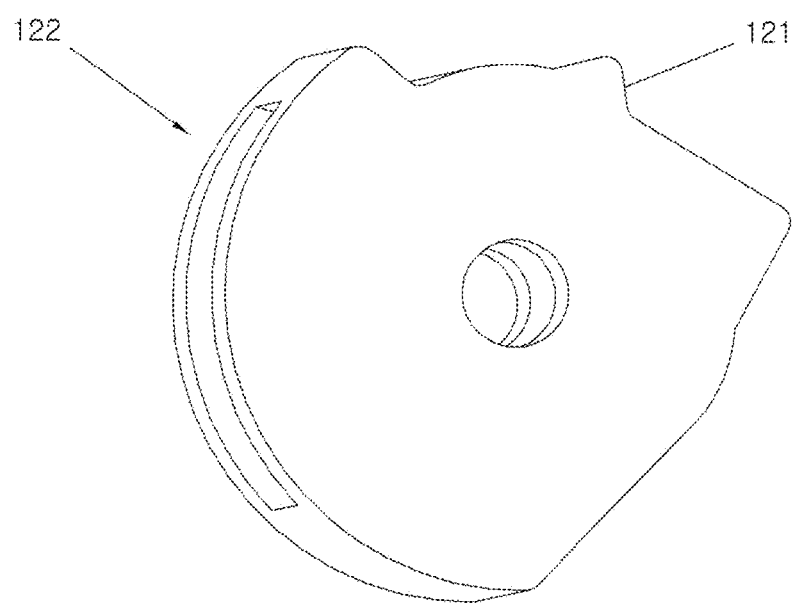
FIG. 16 is a perspective view of a body part of FIG. 14.

FIGS. 14 to 16 show a clutch pedal effort reduction structure using a detent according to another form of the present disclosure.

As shown in FIGS. 14 to 16, in the clutch pedal effort reduction structure using a detent according to another form of the present disclosure, a fixed rib 123 protrudes from one side portion of a pedal arm 100. The pedal arm groove 120 has a body portion 122 which has a mounting hole, into which the fixed rib 123 is inserted, provided on one side thereof and a fixture 124 which penetrates through the body portion 122 and the fixed rib 123 to integrate the fixed rib 123 and the body portion 122. One side of the body portion 122 facing a guide arm 220 is continuously provided with a plurality of curved portions 121. The fixture 124 includes a bolt penetrating through the body portion 122 and the fixed rib 123 and a nut fastened to the bolt. As the body portion 122 is detachably provided to the pedal arm 100, the generation of the pedal effort can be differently changed by changing the body portion 122 only without replacing the pedal arm 100.

In the above description, it is described that the pedal arm groove 120 has at least one curved portion 121 formed therein. As another example, a plurality of curved portions 121 having different curvatures may be continuously formed in the pedal arm grooves 120.

According to the clutch pedal effort reduction structure using a detent according to the form of the present disclosure configured as described above, the degree of reducing the pedal effort by the spring module 200 can be adjusted according to the shape of the plurality of curved portions 121 formed in the pedal arm groove 120.

Further, since the spring module 200 is provided inside the bracket 300 in a fixed form, it is easy to design the layout of the bracket 300 and to reduce the weight of the bracket 300. In particular, when the volume of the bracket 300 is reduced or minimized, it is easy to design the layout of the driver's seat leg room.

Also, since the force by which the spring 240 elastically supports the pedal arm groove 120 is changed according to the position of the adjusting nut 230 mounted on the spring module 200, it is easy to control the reduction of the pedal effort.

In addition, since the position of the spring module 200 is fixed, the service life of the spring 240 is increased or maximized.

In addition, since components other than the pedal arm 100 and the spring module 200 is unnecessary, the assembly is easily made.

What is claimed is:

1. A clutch pedal effort reduction structure using a detent, comprising:
  a pedal arm configured to rotate with respect to a hinge fixed to a vehicle body;
  a bracket mounted on the vehicle body; and
  a spring module configured to reduce a pedal effort when the pedal arm rotates with respect to the hinge,
  wherein the pedal arm includes a pedal arm groove which is provided with one or more curved portions having a curvature, and which rotates depending on the rotation of the pedal arm,
  wherein the spring module includes a support portion which is held in close contact with the pedal arm groove so as to be in contact with the one or more curved portions when the pedal arm rotates and has a position constrained to the vehicle body,
  wherein a force by which the spring module presses the pedal arm is changed according to the curvature of the one or more curved portions when the pedal arm is operated,
  wherein the bracket includes:
    a horizontal member to which the hinge is fixed; and
    a vertical member to which one side end portion of the horizontal member is connected and has first and second ends fixed to the vehicle body, and
  wherein the pedal arm extends from the horizontal member through the vertical member.

2. The clutch pedal effort reduction structure of claim 1, wherein the spring module includes:
- a guide arm fixed to the vertical member so as to protrude toward the hinge;
- an adjusting nut fastened to the guide arm so that the guide arm penetrates through a center of the adjusting nut; and
- a spring arranged around the guide arm configured so as to penetrate through the center of the adjusting nut and having a first side supported by the adjusting nut, and
- wherein the support portion is fastened to the guide arm so as to compress the spring.

3. The clutch pedal effort reduction structure of claim 2, wherein one side end portion of the guide arm is provided with a welding portion which is engaged with the vertical member.

4. The clutch pedal effort reduction structure of claim 2, wherein the support portion includes:
- a fastening arm penetrating through the spring and coupled to the guide arm;
- a plate attached to an end portion of the fastening arm and supporting a second side of the spring; and
- a contact portion formed on a surface of the plate so as to be symmetrical with the fastening arm and being in contact with the one or more curved portions.

5. The clutch pedal effort reduction structure of claim 4, wherein:
- the plate has a disk shape,
- the contact portion is formed along a diameter of the plate, and
- the contact portion has an end portion forming a curvature and being in contact with the one or more curved portions.

6. The clutch pedal effort reduction structure of claim 2, wherein:
- the pedal arm groove includes:
  - a body portion protruding from one side portion of the pedal arm so as to protrude toward the guide arm, and
- one side of the body portion facing the guide arm is provided with the one or more curved portions.

7. The clutch pedal effort reduction structure of claim 2, wherein:
- a fixed rib protrudes from one side portion of a pedal arm, the pedal arm groove includes:
  - a body portion having a mounting hole, into which the fixed rib is inserted, provided on one side thereof; and
  - a fixture penetrating through the body portion and the fixed rib to integrate the fixed rib and the body portion, and
- one side of the body portion facing the guide arm is provided with the one or more curved portions.

8. The clutch pedal effort reduction structure of claim 7, wherein the fixture includes:
- a bolt penetrating through the body portion and the fixed rib; and
- a nut fastened to the bolt.

9. A clutch pedal effort reduction structure using a detent, comprising:
- a pedal arm configured to rotate with respect to a hinge fixed to a vehicle body;
- a bracket mounted on the vehicle body; and
- a spring module configured to reduce a pedal effort when the pedal arm rotates,
- wherein the pedal arm includes a pedal arm groove which is provided with a plurality of curved portions having a curvature, and which rotates depending on the rotation of the pedal arm,
- wherein the spring module includes a support portion which continuously contacts the plurality of curved portions when the pedal arm rotates and has a position constrained to the vehicle body,
- wherein a force by which the spring module presses the pedal arm is changed according to the curvature of the plurality of curved portions with which the support portion is in contact when the pedal arm rotates,
- wherein the bracket includes:
  - a horizontal member to which the hinge is fixed; and
  - a vertical member to which one side end portion of the horizontal member is connected and has first and second ends fixed to the vehicle body, and
- wherein the pedal arm extends from the horizontal member through the vertical member.

10. The clutch pedal effort reduction structure of claim 9, wherein the pedal arm groove includes:
- a body portion protruding from one side portion of the pedal arm so as to protrude toward the spring module, and
- wherein one side of the body portion facing a guide arm is continuously provided with the plurality of curved portions.

11. The clutch pedal effort reduction structure of claim 9, wherein a fixed rib protrudes from one side portion of the pedal arm,
- wherein the pedal arm groove includes:
  - a body portion which has a mounting hole, into which the fixed rib is inserted, provided on one side thereof; and
  - a fixture penetrating through the body portion and the fixed rib to integrate the fixed rib and the body portion, and
- wherein one side of the body portion facing the guide arm is continuously provided with the plurality of curved portions.

12. The clutch pedal effort reduction structure of claim 11, wherein the fixture includes:
- a bolt penetrating through the body portion and the fixed rib; and
- a nut fastened to the bolt.

* * * * *